US005778706A

United States Patent [19]

Testa

[11] Patent Number: 5,778,706

[45] Date of Patent: Jul. 14, 1998

[54] MARINE PROPELLER ANTI-THEFT DEVICE

[76] Inventor: Troy Testa, 365 B Holly Ridge Dr., Lilburn, Ga. 30247

[21] Appl. No.: 884,127

[22] Filed: Jun. 27, 1997

[51] Int. Cl.[6] .......... F16B 41/00

[52] U.S. Cl. .......... 70/14; 70/18; 70/58; 70/232

[58] Field of Search .......... 70/14, 18, 19, 70/57, 58, 164, 229, 232; 416/247 A, 62, 146 B

[56] References Cited

U.S. PATENT DOCUMENTS

| | | | |
|---|---|---|---|
| 2,362,323 | 11/1944 | Stoppel | 416/247 A |
| 2,822,183 | 2/1958 | Montgomery | 416/247 A X |
| 3,759,076 | 9/1973 | Reese | 70/232 |
| 3,981,165 | 9/1976 | Wersinger | 70/232 |
| 4,257,247 | 3/1981 | Sims | 70/232 |
| 4,715,783 | 12/1987 | Wade | 416/146 R |
| 4,760,719 | 8/1988 | Evans et al. | 70/18 |
| 5,176,550 | 1/1993 | Hooper | 416/247 A X |
| 5,184,488 | 2/1993 | Sandlin | 70/14 |
| 5,417,093 | 5/1995 | Heiberg | 70/232 |
| 5,469,721 | 11/1995 | Pyle | 70/14 |
| 5,613,386 | 3/1997 | Mire, Sr. | 70/18 X |

*Primary Examiner*—Lloyd A. Gall
*Attorney, Agent, or Firm*—Terrance L. Siemens

[57] ABSTRACT

An anti-theft device for obstructing access to a nut securing a propeller on a drive shaft of an outboard engine assembly. The device comprises a two part yoke which partially encircles the housing of the engine assembly and its drive train at one end, and at its other end locates a cap over the nut threaded to the drive shaft. The two parts enable adjustment of the longitudinal dimension of the device, for accommodating outboard engine assemblies of different dimensions. In alternative embodiments, two types of locks are provided. One type is an integral key operated locking cylinder. The other type accepts a conventional padlock. In a further alternative embodiment, the cap has projections for engaging propeller blades and preventing these blades from rotating when the device is installed.

9 Claims, 3 Drawing Sheets

MARINE PROPELLER ANTI-THEFT DEVICE

BACKGROUND OF THE INVENTION

1. FIELD OF THE INVENTION

The present invention relates to a device for preventing theft of a marine propeller mounted on an outboard engine of a boat. The device engages a housing enclosing the driveline of the outboard engine, and obstructs access to a nut securing the propeller to a driven shaft.

2. DESCRIPTION OF THE PRIOR ART

Outboard engine assemblies for powering small boats have become quite popular. The engine assembly generally comprises an internal combustion engine, a series of driven shafts, a housing enclosing the engine and shafts, and an exposed propeller. The propeller typically is mounted onto the final shaft by threading, and is secured thereto by a nut. Propellers are readily replaced, as is frequently required due to damage arising from unintended contacts with submerged rocks, by removing the nut.

Ease of replacement has as a consequence ease of theft. As propellers are expensive, theft of propellers has become a problem. The prior art has suggested numerous devices for preventing this type of theft.

Some prior art anti-theft devices obstruct access to the nut. U.S. Pat. Nos. 3,981,165, issued to Merol O. Wersinger on Sep. 21, 1976, 4,257,247, issued to Gary F. Sims on Mar. 24, 1981, and 5,417,093, issued to Martin D. Heiberg on May 23, 1995, all illustrate hoods or generally similar apparatus for covering the rear of the propeller, thereby denying access to the critical nut. These devices generally cooperate closely with the propeller or outboard engine being protected, and thus are potentially limited in applicability to all or most outboard engines. By contrast, the present invention comprises a yoke fabricated from rod stock which slips over the front of the shaft housing, and obstructs access to the nut by a cap. No close fit of the present invention is required for installation, as is generally required by the prior art devices.

Another prior art approach has been to provide a collar securing the propeller assembly to the lower portion of the outboard engine housing. Examples are seen in U.S. Pat. Nos. 4,257,247, issued to Gary Sims on Mar. 24, 1981, 4,715,783, issued to Mark W. Wade on Dec. 29, 1987, and 5,184,488, issued to William H. Sandlin on Feb. 9, 1993. Both devices shown in this latter group fail to obstruct access to the nut securing the propeller to its drive shaft. Both lack the cap and the forwardly open clevis of the present invention, which cap and clevis are more fully set forth hereinafter.

None of the above inventions and patents, taken either singly or in combination, is seen to describe the instant invention as claimed.

SUMMARY OF THE INVENTION

The present invention provides a two part, telescoping yoke which adjusts in length to slip over an outboard engine housing at the propeller. Being fabricated from rod stock, the yoke is more resistant to being sawed or otherwise severed to gain unauthorized access to the critical nut. The device is also more economically fabricated than are the prior art devices requiring complicated configuration of a sheet material. One end of the yoke has a stout enlarged head or cap for obstructing access to the nut. No close fit or cooperation with the shaft housing is required to secure the yoke to the outboard engine.

Two embodiments enable locking either by an integral, key operated cylinder or by a separate conventional padlock. Only minimal precision is required to place the novel anti-theft device in place on the outboard engine, adjust it, and lock it in an operable position.

In a further use, a chain or the like may be attached to the device when installed on an outboard engine, and secured at its other end to a fixed object. This arrangement prevents theft of the lower portion of the outboard engine by partial disassembly of the outboard engine.

Accordingly, it is a principal object of the invention to provide an anti-theft device which is attachable to an outboard engine and obstructs access to the nut securing the propeller to its shaft.

It is another object of the invention to enable adjustability of the device, for accommodating outboard engine assemblies of different dimensions.

It is a further object of the invention to fabricate the device substantially from rod stock, for sturdiness and economy of construction.

Still another object of the invention is to enable locking by padlock.

An additional object of the invention is to provide the novel anti-theft device with an integral lock.

It is again an object of the invention to minimize requirements for precision in fabricating the anti-theft device.

Yet another object of the invention is to provide a stout member for obstructing access to the nut securing the propeller to its shaft.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
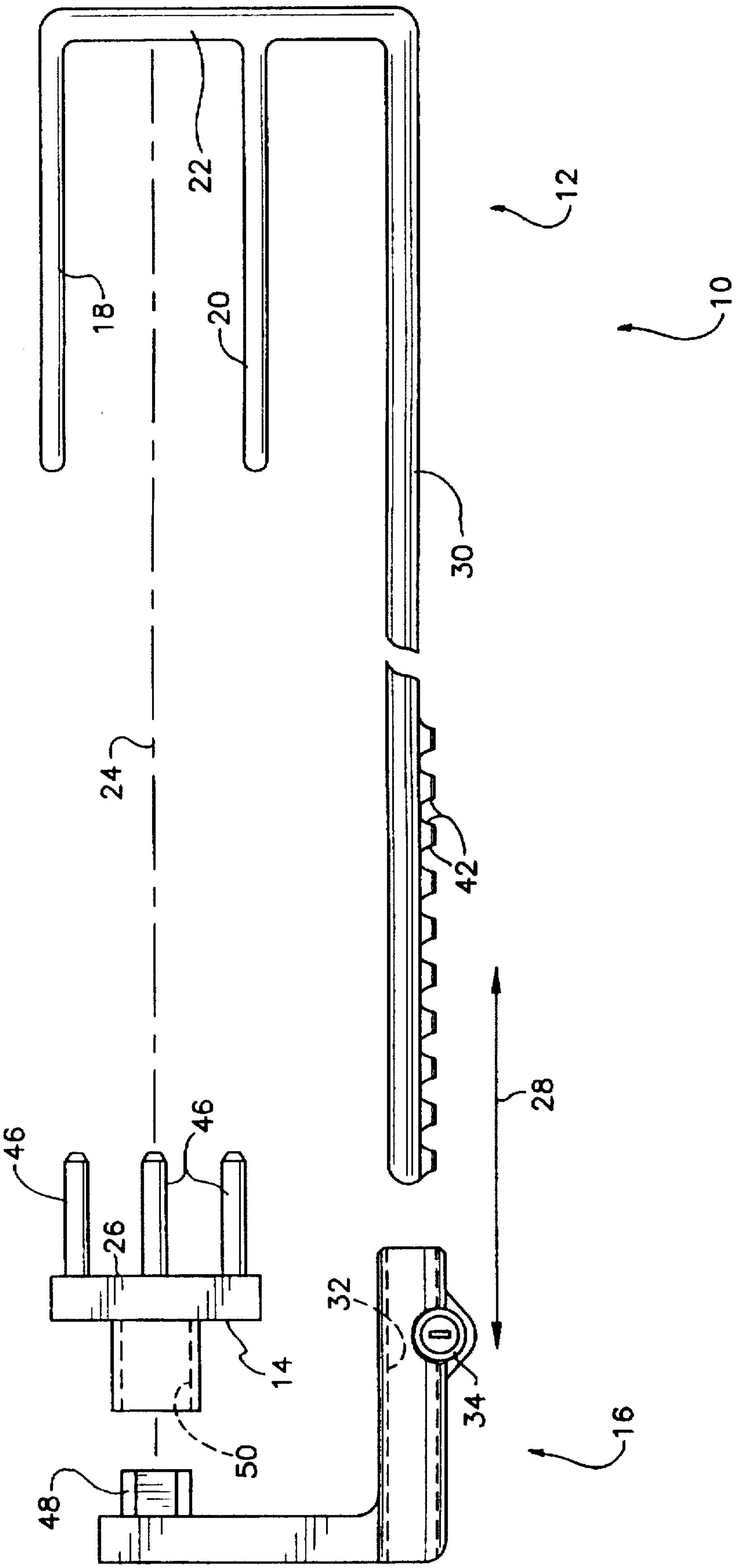
FIG. 1 is an exploded, top plan view of the invention.
Figure 2:
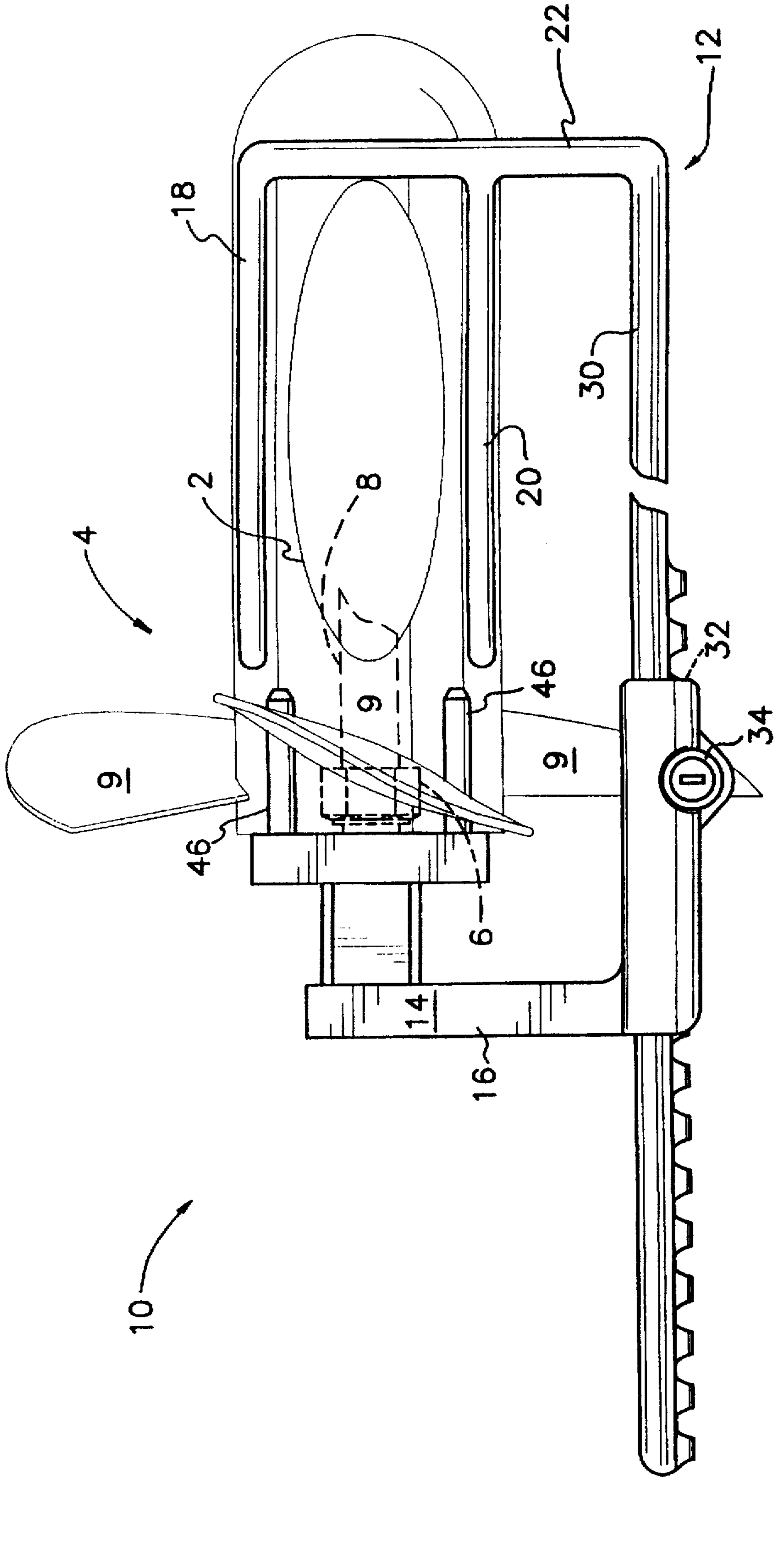
FIG. 2 is an environmental, top plan view of the invention installed on an outboard engine assembly.

Turning now to FIGS. 1 and 2 of the drawings, wherein the invention is shown installed in FIG. 2, the novel anti-theft device 10 is seen to comprise two principal components. One is a clevis component 12 for engaging the lower portion 2 (see FIG. 2) of the shaft housing of an outboard engine assembly (not shown in its entirety). The other major components complement clevis component 12, completing partial encirclement of the shaft housing. These other components are a cap 14 which will obstruct access to a propeller nut 6 securing propeller assembly 4 on its shaft 8 (outboard engine components are shown in FIG. 2), and a connection member 16 connecting cap 14 to clevis component 12 in spaced apart relationship.

Clevis component 12 has left and right lateral members 18, 20, and an end member 22. In combination, members 18, 20, 22 partially encircle or surround the front of lower portion 2 of the outboard engine assembly. Members 18 and 20 also define a clevis center line 24 disposed centrally between and parallel to members 18 and 20. The clevis formed by members 18, 20, and 22 opens to the rear, towards cap 14, so that clevis component 12 is slipped over lower portion 2 of the shaft housing from the front thereof.

Cap 14 is slipped over propeller assembly 4 from the rear thereof, and is joined to clevis component 12 by connection member 16. Connection member 16 both secures cap 14 to clevis component 12, and also maintains face 26 of cap 14 oriented towards clevis component 12.

Anti-theft device 10 is adjustable as to its overall length, length being parallel to center line 24. This adjustment, indicated generally by arrow 28, determines magnitude of a dimension by which cap 14 will be spaced apart from clevis component 12 after installation of device 10 on an outboard engine assembly (see FIG. 2).

Adjustment apparatus is incorporated into clevis component 12 and connection member 16. Clevis component 12 has an arm or inner member 30 fixed rigidly thereto, which penetrates a guide 32 fixed rigidly to connection member 16. Inner member 30 is slidably retained within guide 32 and is constrained to slide parallel to clevis center line 24.

After placing clevis component 12 over lower portion 2 of the shaft housing, cap 14 and connection member 16 are placed over propeller assembly 4 and inner member 30 is simultaneously inserted into guide 32. Clevis member 12 and connection member 16 are then drawn together until the outboard engine is firmly clamped between clevis member 12 and cap 14.

Figure 3:
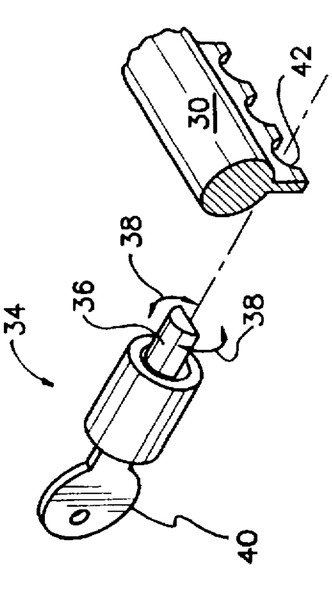
FIG. 3 is an exploded, perspective detail view of components of a lock, taken from the lower part of FIG. 1, shown partly in cross section.

A lock is provided for locking cap 14 in a selected fixed spatial relation with respect to clevis component 12 in the clamped position. In the embodiment depicted in FIG. 1, the lock comprises a key operated cylinder lock 34 mounted on connection member 16. Turning now to FIG. 3, lock 34 is seen to have a semi-cylindrical finger 36 which rotates as indicated by arrows 38 responsively to turning of a key 40 for operating lock 34 into a locked position.

Figure 4:
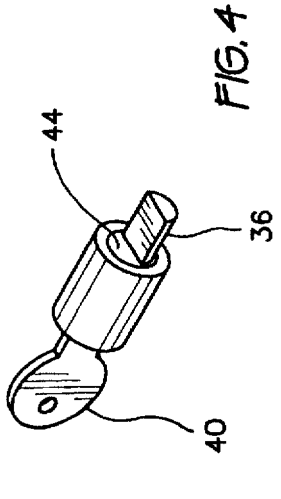
FIG. 4 is a perspective detail view illustrating a component shown at the left of FIG. 3, rotated to a different position.

Finger 36 may be aligned with any one of several cooperating indentations or grooves 42 (see FIG. 1) formed along inner member 30. Lock 34 is arranged so that in one position, finger 36 occupies a groove 42, thereby providing an interfering member which selectively engages one groove 42. When the inner cylinder 44 is rotated by key operation into a disengaged position, as shown in FIG. 4 and shown relative to the position of FIG. 3, finger 36 rotates out of engagement with all grooves 42, thereby freeing inner member 30 to slide along guide 32. When freed, clevis component 12 is installed on, removed from, and adjusted with respect to lower portion 2 of the shaft housing.

FIG. 2 illustrates anti-theft device 10 installed on lower portion 2 of the shaft housing. In this position, clevis component 12 is shown adjusted relative to connection member 16, with cap 14 firmly clamping propeller assembly 4 and lower portion 2 of the shaft housing against clevis component 12.

Cap 14 is seen to have a plurality of projections 46 which project from face 26 of cap 14 and pass between two adjacent blades 9. This feature of cap 14 assists in preventing synchronous rotation of propeller assembly 4 and cap 14, thus precluding unauthorized operation of the outboard engine assembly.

Figure 5:
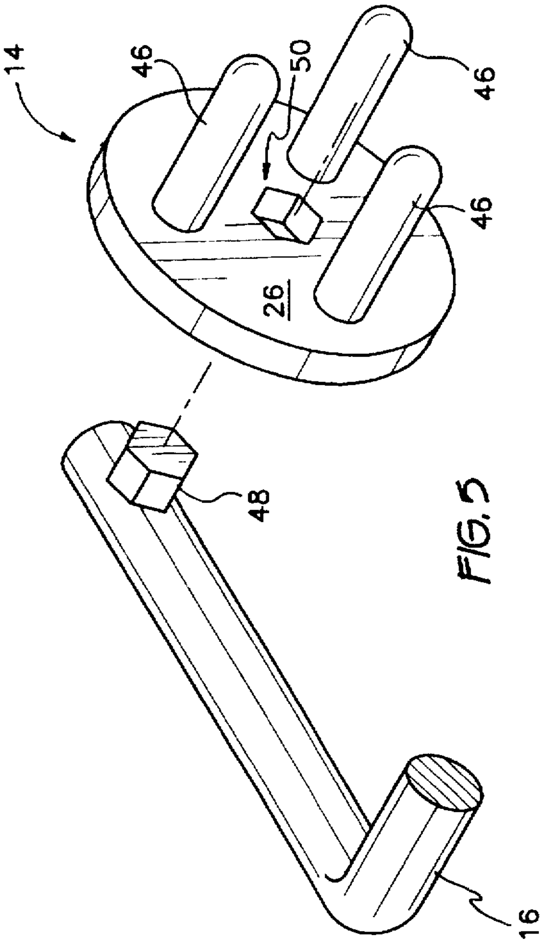
FIG. 5 is an exploded perspective detail view of components shown at the top left of FIG. 1.

Prior to explaining immobilization of propeller assembly 4, and referring now to FIG. 5, it will be appreciated that cap 14 may either be integrally formed with connection member 16, or may be a separate component. In the latter case, as illustrated throughout the drawings, cap 14 is preferably prevented from rotating relative to connection member 16, whereby installation of anti-theft device 10 on an outboard engine both obstructs access to propeller nut 6 and also prevents propeller assembly 4 from rotating on its shaft 8.

This is accomplished by providing connection member with a hexagonal tang 48 which cooperatingly interfits within a hexagonal socket 50 formed in cap 14. Alternatively, as alluded to above, cap 14 could be formed integrally with connection member 16. However, separate construction is preferred since rotational adjustment for conforming to propeller position may be desirable.

Figure 6:
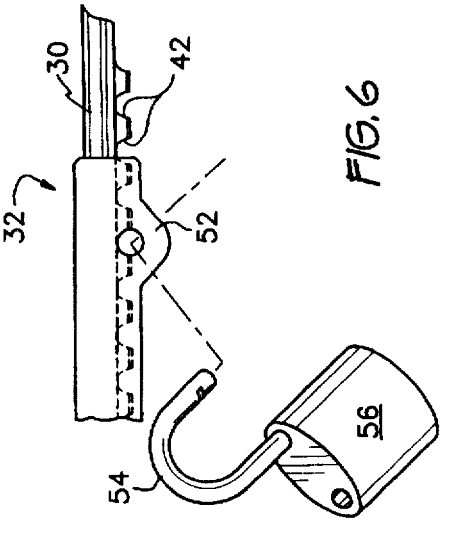
FIG. 6 is a top plan detail view of the invention, illustrating an alternative embodiment employing a hasp, and showing a padlock usable with the hasp.

As shown in FIG. 6, the locking arrangement may comprise a hasp 52 solidly fixed to guide 32 for accepting the staple 54 of an external padlock 56, rather than incorporating an integral lock such as lock 34 of FIG. 1. This enables ready changing of the keying combination, should this become desirable for any reason, or replacement of the lock, if required.

It will be appreciated that the present invention is susceptible to many modifications and variations that may be introduced without departing from the spirit of the invention. Illustratively, guide 32 and locking components may be formed as part of clevis component 12, with grooves 42 being formed in connection member 16.

Also, cap 14 may be constrained against rotation relative to connection member 16 in other ways, such as by providing a pin (not shown) arranged to penetrate aligned holes (not shown) formed in cap 14 and tang 48. In this case, tang 48 may be formed merely by bending the rod stock of connection member 16. The tang and its associated socket formed in cap 14 thus would not need be hexagonal or of any other configuration which is not circular in cross section, for preventing rotation.

In a further variation, lock 34 may be a combination type lock, rather than being operated by a separate key, or still another type of lock.

It is to be understood that the present invention is not limited to the embodiments described above, but encompasses any and all embodiments within the scope of the following claims.

I claim:

1. An anti-theft device for discouraging theft of a propeller from an outboard engine assembly, said anti-theft device comprising:
   - a clevis component having a left lateral member, a right lateral member, and an end member, for partially surrounding the front of a shaft housing of the outboard engine assembly, and a clevis center line disposed centrally between and parallel to said left lateral member and said right lateral member;
   - a cap for obstructing access to a propeller nut, said cap having a face oriented towards said clevis component, and said clevis component arranged to open towards said cap;

a connection member connecting said cap to said clevis component in spaced apart relationship therefrom, and for maintaining said face of said cap oriented towards said clevis component; and locking means for locking said cap in fixed spatial relation to said clevis component.

2. The anti-theft device according to claim 1, further comprising adjustment means for adjusting magnitude of a dimension by which said cap is spaced apart from said clevis component.

3. The anti-theft device according to claim 2, said adjustment means comprising a guide fixed rigidly to one of said clevis component and said connection member, and an inner member slidably retained within said guide and constrained to slide parallel to said clevis center line, said inner member fixed rigidly to the other of said clevis component and said connection member.

4. The anti-theft device according to claim 3, said locking means further comprising groove means defining a plurality of grooves formed along said inner member of said adjustment means, and engagement means for enabling an interfering member to engage one of said grooves.

5. The anti-theft device according to claim 4, said engagement means comprising a key operated locking cylinder having a finger projecting therefrom, said locking cylinder having means for moving said finger between a locked position wherein said finger engages one said groove of said locking means, and a disengaged position wherein said finger is disengaged from all said grooves of said locking means.

6. The anti-theft device according to claim 4, said engagement means comprising a hasp solidly fixed to said guide, for accepting a padlock.

7. The anti-theft device according to claim 1, said cap further comprising projections projecting from said face of said cap towards said clevis component, for passing between two adjacent blades of the propeller, and means for constraining said cap against synchronous rotation with the propeller, whereby installation of said anti-theft device on an outboard engine both obstructs access to the propeller nut and also prevents the propeller from rotating on its shaft.

8. An anti-theft device for discouraging theft of a propeller from an outboard engine assembly, said anti-theft device comprising:

a clevis component having a left lateral member, a right lateral member, and an end member, for partially surrounding the front of a shaft housing of the outboard engine assembly, and a clevis center line disposed centrally between and parallel to said left lateral member and said right lateral member;

a cap for obstructing access to a propeller nut, said cap having a face oriented towards said clevis component, and said clevis component arranged to open towards said cap;

a connection member connecting said cap to said clevis component in spaced apart relationship therefrom, and for maintaining said face of said cap oriented towards said clevis component;

locking means for locking said cap in fixed spatial relation to said clevis component, said locking means further comprising groove means defining a plurality of grooves formed along an inner member of an adjustment means, and engagement means for enabling an interfering member to engage one of said grooves, said engagement means comprising a key operated locking cylinder having a finger projecting therefrom, said locking cylinder having means for moving said finger between a locked position wherein said finger engages one said groove of said locking means, and a disengaged position wherein said finger is disengaged from all said grooves of said locking means; and said adjustment means for adjusting magnitude of a dimension by which said cap is spaced apart from said clevis component, comprising a guide fixed rigidly to one of said clevis component and said connection member, and said inner member slidably retained within said guide and constrained to slide parallel to said clevis center line, said inner member fixed rigidly to the other of said clevis component and said connection member, said cap further comprising projections projecting from said face of said cap towards said clevis component, for passing between two adjacent blades of the propeller, and means for constraining said cap against synchronous rotation with the propeller, whereby installation of said anti-theft device on an outboard engine both obstructs access to the propeller nut and also prevents the propeller from rotating on its shaft.

9. An anti-theft device for discouraging theft of a propeller from an outboard engine assembly, said anti-theft device comprising:

a clevis component having a left lateral member, a right lateral member, and an end member, for partially surrounding the front of a shaft housing of the outboard engine assembly, and a clevis center line disposed centrally between and parallel to said left lateral member and said right lateral member;

a cap for obstructing access to a propeller nut, said cap having a face oriented towards said clevis component, and said clevis component arranged to open towards said cap;

a connection member connecting said cap to said clevis component in spaced apart relationship therefrom, and for maintaining said face of said cap oriented towards said clevis component;

locking means for locking said cap in fixed spatial relation to said clevis component, said locking means further comprising groove means defining a plurality of grooves formed along an inner member of an adjustment means, and engagement means for enabling an interfering member to engage one of said grooves, said engagement means comprising a hasp solidly fixed to a guide, for accepting a padlock; and said adjustment means for adjusting magnitude of a dimension by which said cap is spaced apart from said clevis component, comprising said guide fixed rigidly to one of said clevis component and said connection member, and said inner member slidably retained within said guide and constrained to slide parallel to said clevis center line, said inner member fixed rigidly to the other of said clevis component and said connection member, said cap further comprising projections projecting from said face of said cap towards said clevis component, for passing between two adjacent blades of the propeller, and means for constraining said cap against synchronous rotation with the propeller, whereby installation of said anti-theft device on an outboard engine both obstructs access to the propeller nut and also prevents the propeller from rotating on its shaft.

* * * * *